(12) United States Patent
Michaelis

(10) Patent No.: US 11,868,534 B1
(45) Date of Patent: Jan. 9, 2024

(54) ENHANCED SECURITY FOR VISUALLY IMPAIRED USERS OF TOUCHSCREEN INTERFACES USING FALSE ENTRY NOTIFICATIONS FOR USER INPUT

(71) Applicant: Avaya Management L.P., Durham, NC (US)

(72) Inventor: Paul Roller Michaelis, Louisville, CO (US)

(73) Assignee: Avaya Management L.P., Morristown, NJ (US)

( * ) Notice: Subject to any disclaimer, the term of this patent is extended or adjusted under 35 U.S.C. 154(b) by 0 days.

(21) Appl. No.: 17/871,035

(22) Filed: Jul. 22, 2022

(51) Int. Cl.
*G06F 3/01* (2006.01)
*G09B 21/00* (2006.01)

(52) U.S. Cl.
CPC ............ *G06F 3/016* (2013.01); *G09B 21/003* (2013.01)

(58) Field of Classification Search
CPC ............................. G06F 3/016; G09B 21/003
See application file for complete search history.

(56) References Cited

U.S. PATENT DOCUMENTS

| | | | | |
|---|---|---|---|---|
| 6,327,575 B1 * | 12/2001 | Katz | ................ | G06Q 20/343 705/16 |
| 7,258,269 B1 * | 8/2007 | Block | ................ | G07F 19/205 235/379 |
| 7,513,414 B1 * | 4/2009 | Block | ................ | G07F 19/205 235/379 |
| 8,723,804 B2 * | 5/2014 | Fletcher | ............. | G06F 3/04886 705/16 |
| 9,886,570 B2 * | 2/2018 | Bell | ................ | G06F 21/36 |
| 10,073,959 B2 * | 9/2018 | Boss | ................ | G06F 21/32 |
| 10,726,417 B1 * | 7/2020 | Everhart | ................ | G06Q 20/40 |
| 2012/0050179 A1 * | 3/2012 | Harrow | ................ | G06F 21/36 345/173 |
| 2016/0224113 A1 * | 8/2016 | Day | ................ | G06Q 20/4012 |
| 2017/0269828 A1 * | 9/2017 | Görlich | ................ | G07F 19/201 |
| 2018/0341757 A1 * | 11/2018 | Haque | ................ | G06F 21/316 |

OTHER PUBLICATIONS

Azenkot et al., "PassChords: Secure Multi-Touch Authentication for Blind People," ASSETS'12, Oct. 22-24, 2012, Boulder, Colorado, USA. 8 pages.

* cited by examiner

*Primary Examiner* — Tadesse Hailu

(57) ABSTRACT

The technology disclosed herein enhances security for visually impaired users by presenting haptic notifications to indicate certain input notifications are false. In a particular embodiment, a method includes presenting, from a user system, graphical input elements and presenting a haptic notification. The haptic notification indicates that the next input received after presenting the haptic notification will not be entered by the user system. In response to receiving input of a first input element of the graphical input elements immediately following the haptic notification, the method includes presenting a non-haptic notification. The non-haptic notification falsely indicates the input has been entered.

20 Claims, 7 Drawing Sheets

ENHANCED SECURITY FOR VISUALLY IMPAIRED USERS OF TOUCHSCREEN INTERFACES USING FALSE ENTRY NOTIFICATIONS FOR USER INPUT

TECHNICAL BACKGROUND

Visually impaired users often rely on assistive software features and alternative user interfaces to operate user systems having touchscreens. Such user systems include the vast majority of smartphones and tablet computers currently produced. Many assistive features (e.g., TalkBack for Android™ devices and VoiceOver for Apple® devices) will direct the user system to synthesize speech audibly describing elements being displayed on a touchscreen. If one of the elements is an element for accepting user input (e.g., a button, icon, link, soft-key, etc.), then the user may perform a prescribed action (e.g., double tap the screen) after that element is described to enter the input associated with that element. When the user is entering sensitive information (e.g., passcodes, bank information, etc.) in this manner, users nearby may be able to hear the information read aloud by the assistive feature. Privacy for the visually impaired user is, therefore, compromised relative to a sighted user that does not require audible descriptions from the assistive feature.

SUMMARY

The technology disclosed herein enhances security for visually impaired users by presenting haptic notifications to indicate certain input notifications are false. In a particular embodiment, a method includes presenting, from a user system, graphical input elements and presenting a haptic notification. The haptic notification indicates that the next input received after presenting the haptic notification will not be entered by the user system. In response to receiving input of a first input element of the graphical input elements immediately following the haptic notification, the method includes presenting a non-haptic notification. The non-haptic notification falsely indicates the input has been entered.

In some examples, the method includes receiving second input of one of the graphical input elements and entering the second input into the user system. In those examples, the method may include presenting a second non-haptic notification indicating the second input is entered. Also, in those examples, before receiving the second input, the method may include presenting a second haptic notification that is different from the haptic notification. The second haptic notification indicates that the next input received after presenting the second haptic notification will be entered by the user system and the second input is received immediately following the second haptic notification. Further, in those examples, after receiving the second input, the method may include presenting a second haptic notification that is different from the haptic notification. The second haptic notification in this case indicating the second input is entered.

In some examples, the non-haptic notification includes an audible notification.

In some examples, presenting the graphical input elements includes presenting an audible description of the first input element immediately before receiving the input.

In some examples, the non-haptic notification includes a visual indication that the input has been entered.

In some examples, the graphical input elements represent characters for entering a passcode.

In some examples, the method includes receiving an instruction from a user of the user system activating a privacy feature of the user system, wherein the privacy feature triggers use of the haptic notification.

In another example, an apparatus is provides having one or more computer readable storage media and a processing system operatively coupled with the one or more computer readable storage media. Program instructions stored on the one or more computer readable storage media, when read and executed by the processing system, direct the apparatus to present graphical input elements and present a haptic notification. The haptic notification indicates that the next input received after presenting the haptic notification will not be entered by the user system. In response to receiving input of a first input element of the graphical input elements immediately following the haptic notification, the program instructions direct the processing system to present a non-haptic notification. The non-haptic notification falsely indicates the input has been entered.

DETAILED DESCRIPTION

The user system described herein presents haptic notifications that indicate to the device's user that certain inputs will not be entered even though a different notification falsely indicates that the input has been entered. Specifically, a haptic notification is presented indicating that the next input received into the user system will not be entered. After receiving the next input from the user, the user system presents a notification that the input has been entered (e.g., speaking out that the input has been entered and/or displaying the input in an entry field displayed by the user system). However, in accordance with the haptic notification, that input is not actually entered. As such, a person eavesdropping on the user's input into the system may erroneously conclude from the notification that the input has been entered. That person, being unable to feel the haptic notifications of the user system, will be unaware that they are not receiving the actual information being input by the user.

Figure 1:
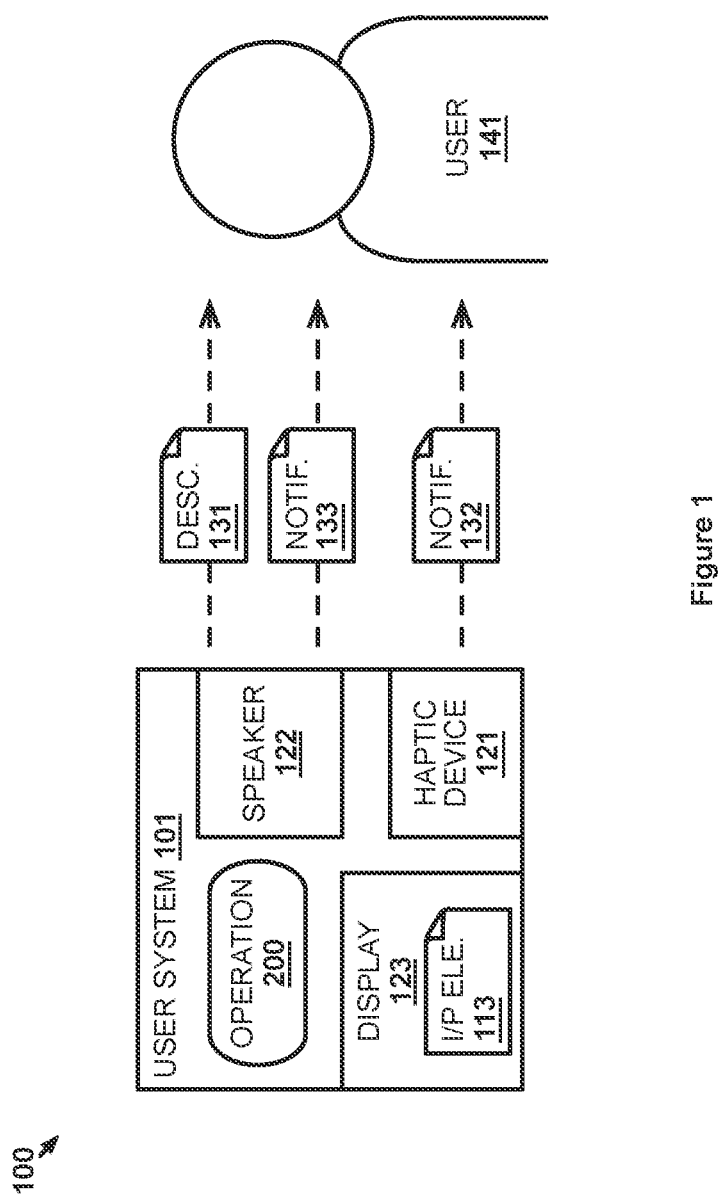
FIG. 1 illustrates an implementation for haptically notifying a user that certain input notifications are false.

FIG. 1 illustrates implementation 100 for haptically notifying a user that certain input notifications are false. Implementation 100 includes user system 101, which is operated by user 141 in this example. User system 101 includes haptic device 121, speaker 122, and display 123. Display 123 may include a Liquid Crystal Display (LCD), Light Emitting Diode (LED) display, Organic LED, or any other type of visual display mechanism. Display 123 is a touchscreen and further includes circuitry and other components to detect a user's touch. Two common types of touchscreens are capacitive and resistive, although alternative touch sensing mechanisms may be used. Speaker 122 may include a magnet, voice coil, diaphragm, or any other type of component for producing sound. Haptic device 121 may include one or more solenoids, motors, electrodes, and/or some other type of component that can be felt by the user when activated. For example, haptic device 121 may include a vibration motor that, when activated, vibrates user system 101. When user 141 is in contact with user 141 (e.g., being held by user 141), user 141 can feel the vibration created by the activation of haptic device 121. In other examples, haptic device 121 may be a peripheral worn by user 141, or otherwise in contact with user 141's body, and in communication with user system 101 to control activation of haptic device 121.

Figure 2:
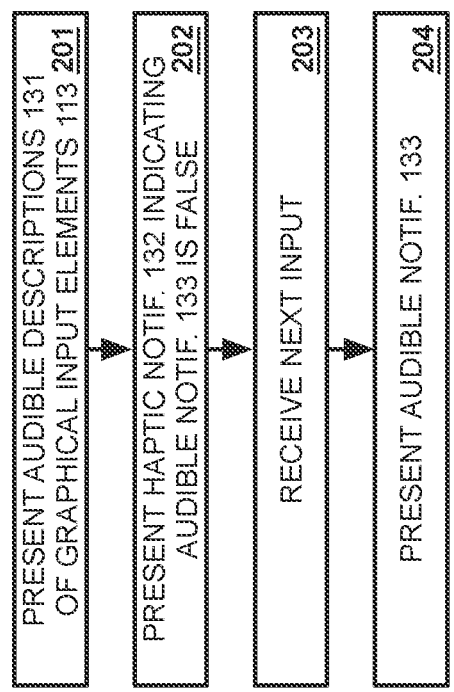
FIG. 2 illustrates an operation to haptically notify a user that certain input notifications are false.

FIG. 2 illustrates operation 200 to haptically notify a user that certain input notifications are false. In operation 200, user system 101 presents graphical input elements 113 to user 141 (201). Graphical input elements 113 may be any type of graphic displayed by user system 101 through which user 141 provides input to user system 101. Graphical input elements 113 may include graphical icons, buttons, links, or some other type of user-selectable graphic. Graphical input elements 113 may include keys of a displayed dial-pad or keyboard (e.g., each letter of the alphabet may be represented by a different one of graphical input elements 113). User system 101 may present graphical input elements 113 visually and/or audibly. Audible presentation of graphical input elements 113 may include user system 101 presenting element descriptions 131 from speaker 122 so as even a visually impaired user will understand graphical input elements 113. User system 101 may present element descriptions 131 for all of graphical input elements 113 automatically or may present respective ones of element descriptions 131 in response to actions taken by user 141. For example, user 141 may move their finger on display 123 and, when the finger is on a particular one of graphical input elements 113, user system 101 presents a description of that graphical input element (e.g., when on the letter 'R' of a keyboard, user system 101 may synthesize speech saying "R" or "The letter R"). When the finger moves to another graphical input element, a description of that element is presented. In some examples, operation 200 may be of benefit to non-visually impaired users and element descriptions 131 may not be necessary as the user can see graphical input elements 113 on display 123. Alternatively, if a visually impaired user cannot see display 123 anyway, then graphical input elements 113 may not actually be displayed (e.g., to save battery power). As such, element descriptions 131 describe what would be displayed (i.e., graphical input elements 113) and user touches on display 123 would be mapped to where graphical input elements 113 would be displayed if display 123 was actually displaying those elements. Similarly, rather than displaying nothing, user system 101 may display something other than graphical input elements 113 as a decoy display presentation to deceive a person looking at display 123. For example, display 123 may display a representation of a music player application as a decoy to give other people the impression that user 141 is managing their music library rather than interactive with graphical display elements 113. In such examples, element descriptions 131 are presented to describe graphical input elements 113, which would be displayed had the decoy display not been presented, and user touches on display 123 would be mapped to where graphical input elements 113 would be displayed if display 123 was actually displaying those elements.

User system 101 presents haptic notification 132 to indicate that the next input received after presenting haptic notification 132 will not be entered by user system 101 (202). Haptic notification 132 may be any type of haptic output by haptic device 121. Different types of haptic notifications from user system 101 (e.g., vibration patterns, tap patterns, etc.) may correspond to different information being conveyed. For example, one vibration pattern (e.g., two short vibrations) may be used for haptic notification 132 to convey to user 141 that the next input will not be entered while another vibration pattern (e.g., one long followed by one short vibration) may be used to convey that a message has been received. In some examples, haptic notification 132 may not be unique with respect to other haptic notifications but the context of graphical input elements 113 in association with haptic notification 132 enables user 141 to recognize that haptic notification 132 is meant to convey the next input will not be entered.

User system 101 receives input of one of graphical input elements 113 immediately following haptic notification 132 (203). User 141 may provide the input by simply selecting the graphical input element (e.g., tapping on display 123 where the element is displayed) or may provide the input in some other prescribed manner. For example, user system 101 may be executing an assistive feature for visually impaired users that also handles element descriptions 131. When the graphical input element is spoken in element descriptions 131, the assistive feature may indicate that user 141 can tap, or double tap, anywhere on the screen to input the element that was just spoken. User 141, therefore, does not need to see exactly where the desired graphical input element is displayed to select it. Regardless of how the input is received, the input is immediate in the sense that the input is received with no intervening input from when haptic notification 132 was presented. Otherwise, that intervening input would have been the next received input from user 141.

In response to receiving the input, user 141 presents a non-haptic notification falsely indicating the input has been entered (204). The non-haptic notification is a false indication of input entry because the input is not actually input for the purposes user 141 is purportedly doing so, as haptic notification 132 previously indicated. For instance, if user 141 is entering a bank account number, user system 101 the input is not considered part of the number even if the non-haptic notification indicates otherwise. The non-haptic notification may be visual and/or audible. A visual notification may include displaying the input on display 123 (e.g., in a text/digit entry field) or, if the input itself is not displayed, displaying a graphical indication of entry being accepted (e.g., a screen flash). Even in examples where the input is displayed, since the display is a false indication, the input is not actually used by whatever part of user system 101 receiving input. For instance, if user 141 is entering a passcode to enter a banking application, the application would not enter the input as part of the passcode. Thus, if a person other than user 141 is looking at display 123, that person will see the input as being included in the passcode even though it is not actually entered. In this example, non-haptic notification 133 is presented via speaker 122. Non-haptic notification 133 may simply indicate that input has been entered implying that the immediately preceding input element that was described correspond to the input (e.g., may speak "Input entered") or non-haptic notification 133 may indicate the specific input (e.g., may speak "6 entered" if the input was for the number 6). If a person overhearing sound made by user system 101 hears non-haptic notification 133, that person will hear that the input has been entered even though user system 101 has not entered the input.

User system 101 may arbitrarily choose when to use haptic notification 132 during entry of information from user 141 or may have rules that define when and how often haptic notification 132 should be used. For example, a rule governing user system 101 may indicate that, during entry of information, at least one input per every four characters entered should be subject of a false non-haptic notification as indicated by an instance of haptic notification 132. Each time user system 101 determines that a false non-haptic notification should be presented, user system 101 repeats steps 202-204. Other input that is not immediately preceded by an instance of haptic notification 132 is entered. In some examples, user system 101 may automatically detect when sensitive information is being entered (e.g., may recognize a password entry field, bank account entry field, etc.) and enable the use of haptic notification 132 to indicate false non-haptic notifications. The method performed in operation 200 may also be part of a privacy feature of user system 101, or of an application executing on user system 101, that user 141 can instruct user system 101 to turn on to trigger the use of the haptic notifications described herein. In some cases, user 141 may be able to turn the feature on/off on the fly whenever they desire (e.g., when sensitive information is to be entered and user 141 is in a public space, then user 141 may choose to input a button combination, gesture, or other type of input to trigger user system 101 to use the haptic notifications). User 141 may also be able to define when the haptic notifications are used (e.g., at all times or for certain types of information entry). The privacy feature may be a component of an assistive feature (e.g., a component of user system 101 operating system) that visually impaired users use to operate user system 101 (e.g., the assistive feature may read out displayed elements and enable user 141 to select an input that has been read). In other examples, operation 200 may be performed at the direction of the application receiving the input. For instance, a banking application may include a feature that, at least when enabled by user 141 if not on by default, uses instances of haptic notification 132, and corresponding non-haptic notifications to false indicate input being entered, when user 141 is entering sensitive information into the application.

Advantageously, user system 101 enables user 141 to provide inputs into user system 101 that are not entered while other inputs are entered. Since user system 101 presents a non-haptic notification that each input is entered, an eavesdropper on user 141's use of user system 101 cannot tell the difference between any of the inputs. Only user 141 knows which of the inputs was not actually entered due to receiving instances of haptic notification 132 prior to certain ones of the inputs.

Figure 3:
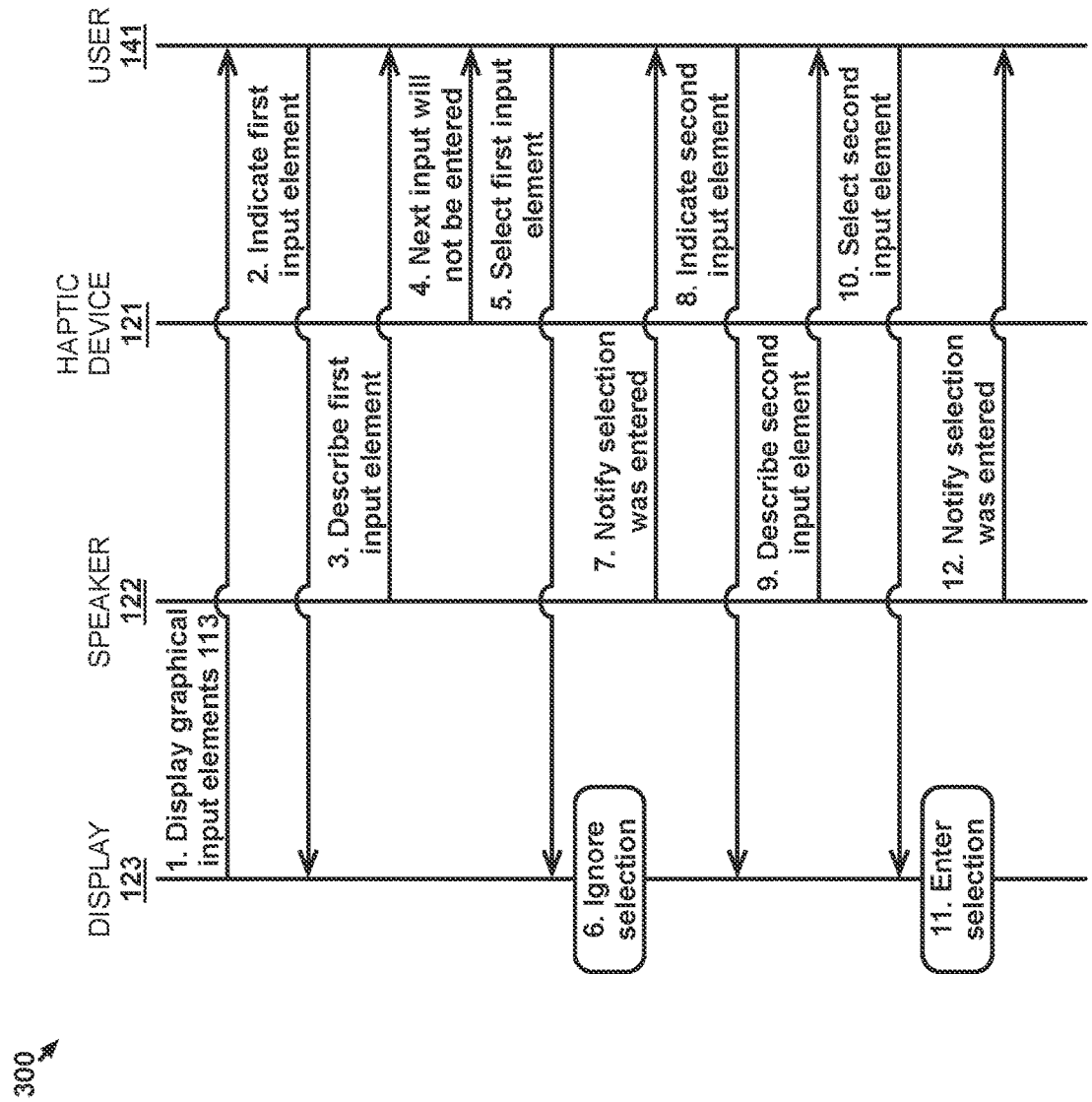
FIG. 3 illustrates an operational scenario for haptically notifying a user that certain input notifications are false.

FIG. 3 illustrates operational scenario 300 for haptically notifying a user that certain input notifications are false. Operational scenario 300 is an example where input from two input elements is received by user system 101. One input to one element is entered and input to the other is not. User system 101 is executing an assistive feature that, when user 141 indicates an input element of graphical input elements 113 (e.g., places their finger over the location on display 123 where a particular input element is displayed), the feature directs user system 101 to audibly describe the input element. Even if user 141 is visually impaired, they can determine whether to select the input element for input based on the audible description thereof. The assistive feature may also allow user 141 to double tap, or perform some other action, to indicate their desire to select the described input element as input.

In operational scenario 300, display 123 displays graphical input elements 113 at step 1. In this example, graphical input elements 113 are characters that are used to enter a passcode. For example, graphical input elements 113 may be keys on a keyboard or number pad displayed on user system 101. User 141 indicates a first input element of graphical input elements 113 at step 2 on display 123. For instance, user 141 may place their finger on display 123 and display 123 may detect that the finger is placed on the first input element. In response, to identifying the first input element, speaker 122 presents an audible description of the first input element at step 3. For example, if the first input element is a key for the letter 'R', then speaker 122 may present a voice saying "R" to user 141. User system 101 determines that the next input from user 141 should not be entered but, instead, user system 101 should present a false non-haptic notification that the input has been entered. The determination may be made arbitrarily, based on a rule for presenting false notifications, or based on some other logic. In response to the determination, haptic device 121 presents a haptic notification (e.g., a vibration pattern) to user 141 at step 4 that the next input received from user 141 will not be entered. After receiving the haptic notification, user 141 inputs the first input via display 123 at step 5. For instance, since the first input element is the most recently described input element of graphical input elements 113, user 141 may double tap display 123 to indicate the selection of that input.

In this example, since the first input element is the next input element after presenting haptic notification 132, user system 101 ignores the selection of the first input element and does not enter it. Although, user system 101 proceeds with an audible notification at step 7 that falsely indicates the first input element was entered. While user 141 knows the audible notification is false based on the preceding haptic notification, anyone overhearing speaker 122 would think that the input from the first input element was entered. If, for example, the first input element represented the letter 'R,' then speaker 122 may play a sound (e.g., a beep) noting that the previously described input was entered or may play a voice saying the letter 'R' was entered even though the letter was not entered.

While the haptic notification in this example was played after the first input element was described, the haptic notification may be presented anytime preceding the next input (e.g., may be presented prior to an input element being described). Similarly, while user 141 chose to select the first input element in this case, user 141 may have instead moved their finger to one or more other input elements of graphical input elements 113, and have those elements described via speaker 122, before deciding to select one for false entry. Also, while operational scenario 300 presents the haptic notification prior to receiving any input, it should be understood that user system 101 may allow user 141 to provide input using one or more of graphical input elements 113 prior to determining that a false entry notification should be used.

User 141 then indicates a second input element of graphical input elements 113 on display 123 at step 8. User system 101 audibly describes the second input element via speaker 122 at step 9 and user 141 selects the second input element at step 10. In this case, since a haptic notification indicating the next input will not be entered was not presented immediately preceding the selection of the second input element, user system 101 enters the selected input of the second input element at step 11 and presents an audible notification at step 12 via speaker 122 indicating that the input of the second input element has been entered. The audible notification of step 12 is similar to the audible notification provided at step 7. As such, someone overhearing the audible notifications would not be able to tell any difference between the audible notification that the first input element was entered and the audible notification that the second input element was entered. However, user 141 will know that the second input element was entered while the first input element was not based on the haptic notification that preceded the audible notification that the first input element was entered.

Figure 4:
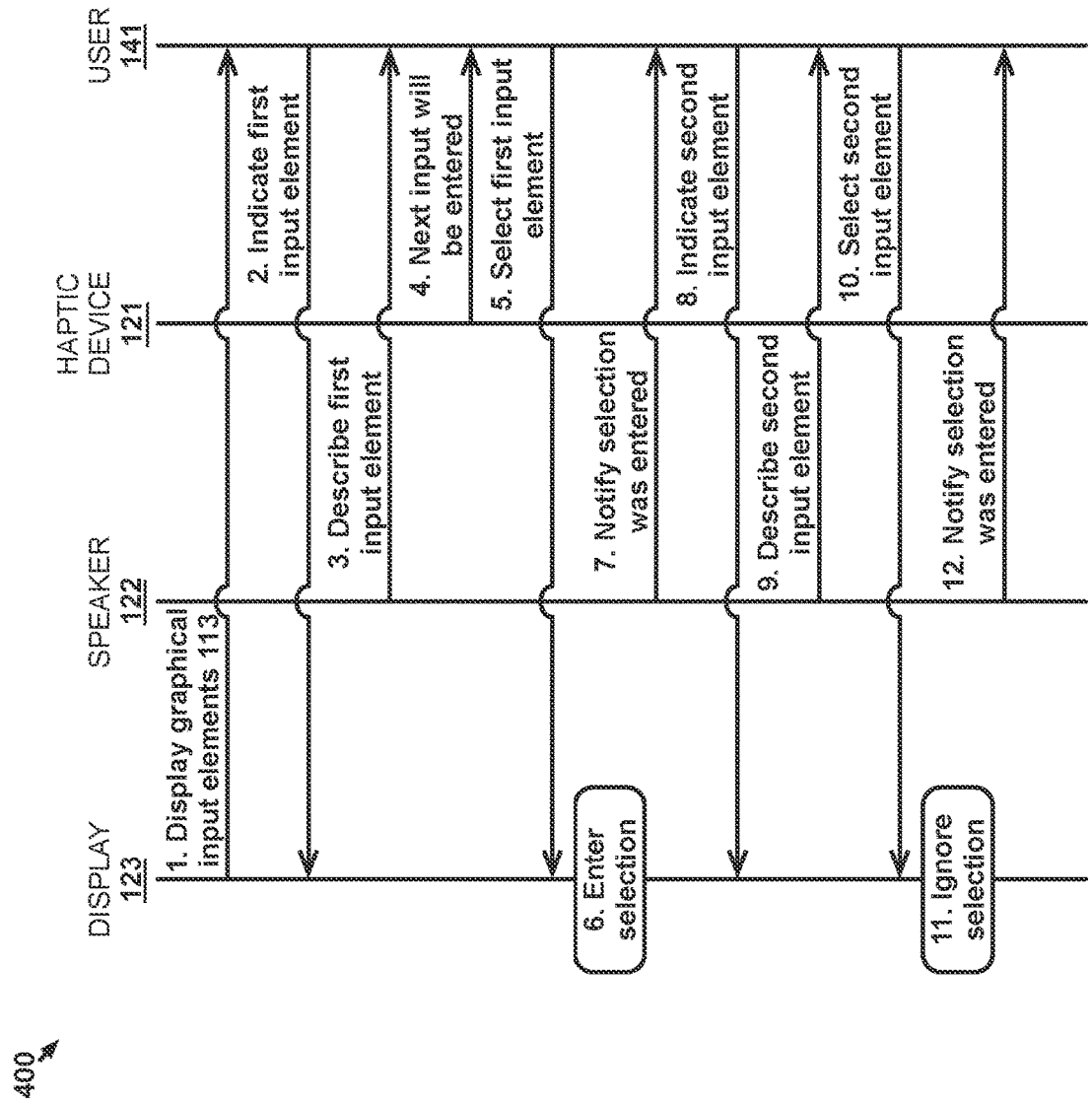
FIG. 4 illustrates an operational scenario for haptically notifying a user that certain input notifications are false.

FIG. 4 illustrates operational scenario 400 for haptically notifying a user that certain input notifications are false. Operational scenario 400 describes an alternative manner of using haptic device 121 to indicate which inputs are entered by user system 101. Specifically, in this example, haptic device 121 is used to present haptic notifications indicating that next input will be entered rather that will not be entered. Operational scenario 400 begins like operational scenario 300 with display 123 displaying graphical input elements 113 at step 1. Similarly, user 141 indicates a first input element of graphical input elements 113 at step 2 and user system 101, responsively, audibly describes the first input element at step 3 via speaker 122.

In this example, user system 101 notifies user 141 haptically when the next input will be entered rather than notifying user 141 when the next input will not be entered. User system 101 may use similar logic as in operational scenario 300 to determine which input should be entered or not entered but uses a different notification strategy in operational scenario 400. Specifically, before entering a next input, user system 101 presents a haptic notification from haptic device 121 at step 4 to notify user 141 that the next input will be entered. The haptic notification comes after speaker 122 presents the description of the first input element but could occur at anytime prior to receiving the next input. After the haptic notification, user 141 selects the first input element as input at step 5. Although, in other examples, user 141 may indicate other input elements, which are described via speaker 122, prior to finally selecting a next input. In accordance with the haptic notification provided by user system 101, user system 101 entered the selected input at step 6 and presents an audible notification that the input has been entered at step 7.

User 141 proceeds with entering information into user system 101 by indicating a second input element at step 8, which is then described audibly at step 9 via speaker 122. User 141 selects the second input element at step 10. However, since the selection of the second input element was not immediately preceded by a haptic alert indicating the next input selection will be entered, user system 101 ignores the selection and does not enter it at step 11. Despite not entering the selection, user system 101 still presents an audible notification at step 12 that indicates the selected input was entered in a similar manner to the audible notification at step 7.

In other examples, the haptic notification mechanisms of operational scenario 300 and operational scenario 400 may be combined. A haptic notification of a given type may be presented before every input. One type of haptic notification (e.g., one vibration pattern) may be presented prior to all inputs that will be entered and a different type of haptic notification (e.g., a different vibration pattern) may be presented prior to all inputs that will not be entered. For example, a single vibration pulse may indicate that a next input will be entered and then a double vibration pulse may indicate that the next input will not be entered. In both cases, as described herein, a non-haptic notification will be presented for each input indicating that the inputs were entered.

Figure 5:
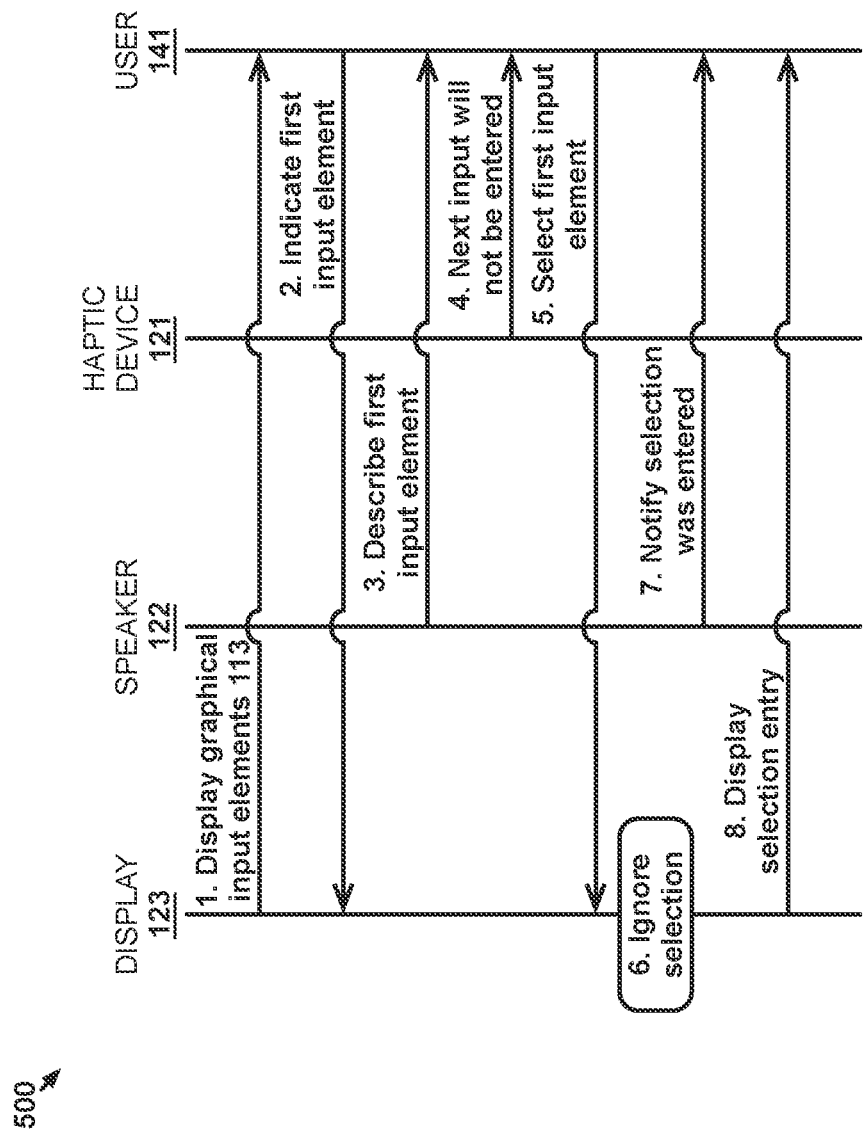
FIG. 5 illustrates an operational scenario for haptically notifying a user that certain input notifications are false.

FIG. 5 illustrates operational scenario 500 for haptically notifying a user that certain input notifications are false. Operational scenario 500 is an example of how a visual non-haptic notification may be presented to user 141. The visual non-haptic notification are described here in conjunction with the audible notifications described above in scenarios 300 and/or 400 but may be used independently. Operational scenario 500 begins with graphical input elements 113 displayed at step 1 via display 123. In this example, user 141 again indicates a first input element at step 2 and user system 101 responsively describes the first input element at step 3 via speaker 122. User system 101 determines that the next input will not be entered and presents a haptic notification from haptic device 121 at step 3 to alert user 141 to that determination. After receiving the haptic notification, user 141 selects the first input element at step 5. While this example uses an assistive feature to audibly describe indicated input elements like the scenarios above, some examples may not use audible descriptions and associated input selection mechanism. For instance, user 141 may not be visually impaired and my simply tap on their desired input element.

Since the haptic notification indicated that the next input received from user 141 would not be entered, user system 101 ignores the selection for entry purposes at step 6. Despite not entering the selected input, user system 101 still presents both an audible notification at step 7 from speaker 122 and a visual notification at step 8 from display 123 indicating that the selection was entered. In some examples, the visual notification may include presenting a character represented by the first input element in a text entry field displayed by display 123. A person other than user 141 overlooking display 123 would see that the character was entered and believe that entry actually occurred having not received the haptic notification like user 141. User 141, on the other hand, knows the character was not entered despite it being displayed.

Figure 6:
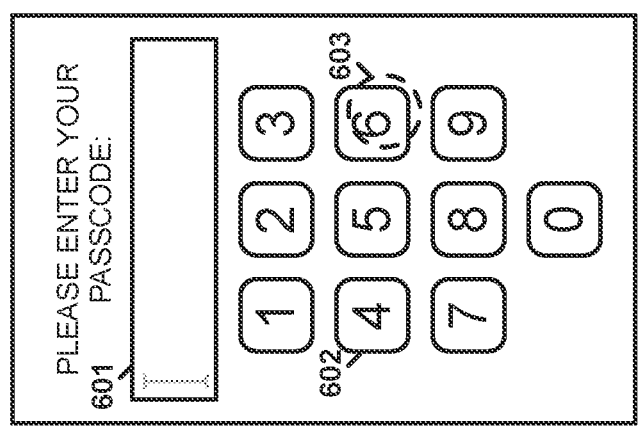
FIG. 6 illustrates a graphical display of a user system for haptically notifying a user that certain input notifications are false.

FIG. 6 illustrates graphical display 600 of user system 101 for haptically notifying a user that certain input notifications are false. Graphical display 600 is an example of what may be displayed by display 123 when user 141 is entering information into user system 101 with haptic notifications indicating which inputs are not actually entered. In this example, user 141 is being asked to enter their passcode into entry field 601. The passcode may be requested to allow user 141 to unlock user system 101, access an application or feature of an application on user system 101, access a webpage on user system 101, or for some other reason a passcode may be required. The passcode in this example only includes digits from 0-10 and number pad 602 displays only those digits accordingly. The number keys in number pad 602 are an example of graphical input elements 113 discussed above. Other examples may allow other characters for passcode entry and may, therefore, include other graphical input elements (e.g., may display a full keyboard layout).

Graphical display 600 shows entry field 601 prior to any inputs being selected by user 141. In this example, touch point 603 indicates that user 141 has placed their finger on the number 6 key of number pad 602. If no assistive feature is activated, then touching the number 6 key may select that key. In the above examples where an assistive feature is activated, user system 101 may provide an audible description of the number 6 key so that user 141 knows where their finger is resting. User 141 can then perform further action (e.g., double tapping) to select the number 6 key. In this example, no haptic notification indicating the next entry will not be presented to user 141 by user system 101 prior to receiving input from the number 6 key. The number 6 is, therefore, entered normally, as shown in graphical display 700.

Figure 7:
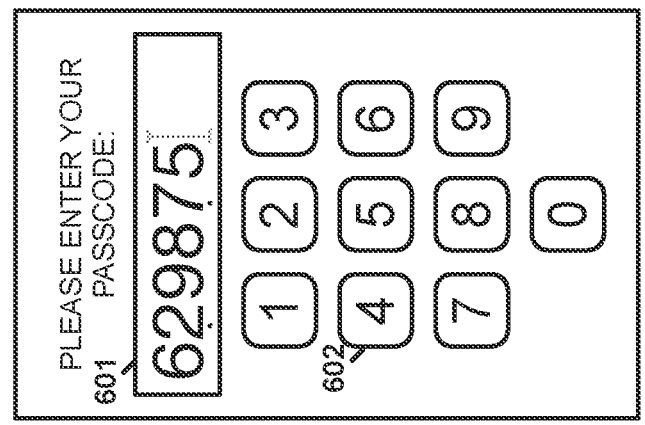
FIG. 7 illustrates a graphical display of a user system for haptically notifying a user that certain input notifications are false.

FIG. 7 illustrates graphical display 700 of user system 101 for haptically notifying a user that certain input notifications are false. Graphical display 700 is an example of graphical display 600 after user 141 has provided six input selections. Entry field 601 now shows the number 6, as discussed above with respect to graphical display 600, along with five additional digits. In this example, the passcode requested from user 141 is only four digits long even though six digits have been entered. The dots below the '2' and the '7' indicate that those two digits were not actually entered by user system 101. That is, immediately prior to user 141 selecting the number 2 key, user system 101 presented a haptic notification to user 141 to indicate that the next input (i.e., the number 2) will not be entered. Similarly, a haptic notification indicating the next input would not be entered was presented to user 141 immediately preceding user 141's entry of the number 7 key. Although not illustrated, user system 101 may have provided an audible confirmation of each digit's entry regardless of whether the digit was actually entered, as described in the scenarios above. Given that the '2' and the '7' were not actually entered for purposes of recognizing user 141's passcode, the passcode entered by user 141 is '6985'. Presuming that is the correct passcode, user 141 will gain access to whatever on user system 101 is requesting the passcode. A person that sees the display of user system 101 would be led to believe that the passcode is actually six digits long (i.e., is '629875'). User 141's actually passcode is, therefore, safe from prying eyes.

While this example included little dots below the digits that were not entered by user system 101 into user 141's passcode, other examples may use different indicators or no indicators at all for those digits. For instance, entry field 601 may simply include the string '629875' and rely on user 141 to keep track of which digits were not actually entered. Alternatively, indicators may be used to indicate which digits were actually entered or different indicators may be used to differentiate digits entered from those that were not. Preferably, if indicators are to be used, the indicators are such that a person overlooking user system 101 will not see the indicators or the person will at least not recognize the indicators as represented whether the input is actually entered.

Figure 8:
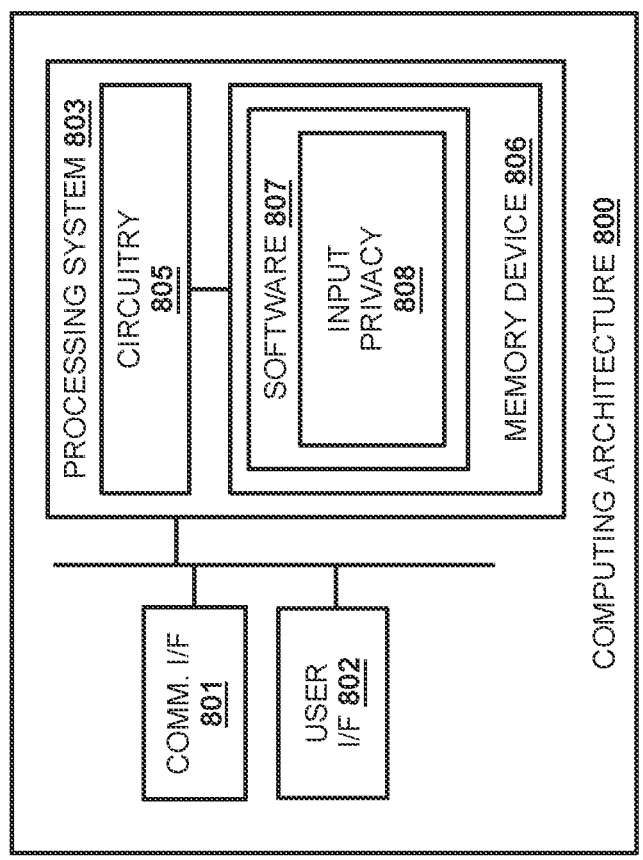
FIG. 8 illustrates a computing architecture for haptically notifying a user that certain input notifications are false.

FIG. 8 illustrates computing architecture 800 for haptically notifying a user that certain input notifications are false. Computing architecture 800 is an example computing architecture for user system 101, although user system 101 may use alternative configurations. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises one or more computer readable storage media, such as a disk drive, flash drive, data storage circuitry, or some other memory apparatus—including combinations thereof. In no examples would a computer readable storage medium of memory device 806, or any other computer readable storage medium herein, be considered a transitory form of signal transmission (often referred to as "signals per se"), such as a propagating electrical or electromagnetic signal or carrier wave. Operating software 807 comprises computer programs, firmware, or some other form of machine-readable processing instructions. Operating software 807 comprises computer programs, firmware, or some other form of machine-readable processing instructions. Operating software 807 includes input privacy module 808. Operating software 807 may further include an operating system, utilities, drivers, network interfaces, applications, or some other type of software. When executed by processing circuitry 805, operating software 807 directs processing system 803 to operate computing architecture 800 as described herein.

In particular, operating software 807 directs processing system 803 to present graphical input elements. Input privacy module 808 directs processing system 803 to present a haptic notification from the user system. The haptic notification indicates that the next input received after presenting the haptic notification will not be entered by the user system. In response to receiving input of a first input element of the graphical input elements immediately following the haptic notification, input privacy module 808 directs processing system 803 to present a non-haptic notification, wherein the non-haptic notification falsely indicates the input has been entered.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
   presenting, from a user system, graphical input elements;
   presenting a haptic notification from the user system, wherein the haptic notification indicates that the next input received after presenting the haptic notification will not be entered by the user system; and
   in response to receiving input of a first input element of the graphical input elements immediately following the haptic notification, presenting a non-haptic notification, wherein the non-haptic notification falsely indicates the input has been entered.

2. The method of claim 1, comprising:
receiving second input of one of the graphical input elements; and
entering the second input into the user system.

3. The method of claim 2, comprising:
presenting a second non-haptic notification indicating the second input is entered.

4. The method of claim 2, comprising:
before receiving the second input, presenting a second haptic notification that is different from the haptic notification, wherein the second haptic notification indicates that the next input received after presenting the second haptic notification will be entered by the user system, and wherein the second input is received immediately following the second haptic notification.

5. The method of claim 2, comprising:
after receiving the second input, presenting a second haptic notification that is different from the haptic notification, wherein the second haptic notification indicating the second input is entered.

6. The method of claim 1, wherein the non-haptic notification comprises an audible notification.

7. The method of claim 1, wherein presenting the graphical input elements comprises:
presenting an audible description of the first input element immediately before receiving the input.

8. The method of claim 1, wherein the non-haptic notification comprises a visual indication that the input has been entered.

9. The method of claim 1, wherein the graphical input elements represent characters for entering a passcode.

10. The method of claim 1, comprising:
receiving an instruction from a user of the user system activating a privacy feature of the user system, wherein the privacy feature triggers use of the haptic notification.

11. An apparatus comprising:
one or more computer readable storage media;
a processing system operatively coupled with the one or more computer readable storage media; and
program instructions stored on the one or more computer readable storage media that, when read and executed by the processing system, direct the apparatus to:
present graphical input elements;
present a haptic notification from the user system, wherein the haptic notification indicates that the next input received after presenting the haptic notification will not be entered by the user system; and
in response to receiving input of a first input element of the graphical input elements immediately following the haptic notification, present a non-haptic notification, wherein the non-haptic notification falsely indicates the input has been entered.

12. The apparatus of claim 11, wherein the program instructions direct the apparatus to:
receive second input of one of the graphical input elements; and
enter the second input into the user system.

13. The apparatus of claim 12, wherein the program instructions direct the apparatus to:
present a second non-haptic notification indicating the second input is entered.

14. The apparatus of claim 12, wherein the program instructions direct the apparatus to:
before receiving the second input, present a second haptic notification that is different from the haptic notification, wherein the second haptic notification indicates that the next input received after presenting the second haptic notification will be entered by the user system, and wherein the second input is received immediately following the second haptic notification.

15. The apparatus of claim 12, wherein the program instructions direct the apparatus to:
after receiving the second input, present a second haptic notification that is different from the haptic notification, wherein the second haptic notification indicating the second input is entered.

16. The apparatus of claim 11, wherein the non-haptic notification comprises an audible notification.

17. The apparatus of claim 11, wherein to present the graphical input elements, the program instructions direct the apparatus to:
present an audible description of the first input element immediately before receiving the input.

18. The apparatus of claim 11, wherein the non-haptic notification comprises a visual indication that the input has been entered.

19. The apparatus of claim 11, wherein the program instructions direct the apparatus to:
receiving an instruction from a user of the user system activating a privacy feature of the user system, wherein the privacy feature triggers use of the haptic notification.

20. One or more computer readable storage media having program instructions stored thereon that, when read and executed by a processing system, direct the processing system to:
present graphical input elements;
present a haptic notification, wherein the haptic notification indicates that the next input received after presenting the haptic notification will not be entered by a user system; and
in response to receiving input of a first input element of the graphical input elements immediately following the haptic notification, present a non-haptic notification, wherein the non-haptic notification falsely indicates the input has been entered.

* * * * *